(12) United States Patent
Auzas et al.

(10) Patent No.: US 8,970,954 B2
(45) Date of Patent: Mar. 3, 2015

(54) POLARIZATION CONVERTER OF BIDIRECTIONAL CYLINDRICAL SYMMETRY AND CARTESIAN-CYLINDRICAL POLARIZATION CONVERSION METHOD

(75) Inventors: Frederic Auzas, Paris (FR); Olivier Acher, Gif-sur-Yvette (FR)

(73) Assignee: Horiba Jobin Yvon SAS, Longjumeau (FR)

( * ) Notice: Subject to any disclaimer, the term of this patent is extended or adjusted under 35 U.S.C. 154(b) by 187 days.

(21) Appl. No.: 13/810,902

(22) PCT Filed: Jul. 18, 2011

(86) PCT No.: PCT/FR2011/051716
§ 371 (c)(1),
(2), (4) Date: Jan. 18, 2013

(87) PCT Pub. No.: WO2012/017159
PCT Pub. Date: Feb. 9, 2012

(65) Prior Publication Data
US 2013/0114140 A1  May 9, 2013

(30) Foreign Application Priority Data

Jul. 19, 2010 (FR) ...................................... 10 55839

(51) Int. Cl.
*G02B 5/30* (2006.01)
*G02B 27/28* (2006.01)

(52) U.S. Cl.
CPC ................ *G02B 5/30* (2013.01); *G02B 5/3016* (2013.01); *G02B 27/286* (2013.01)
USPC ............ 359/486.01; 359/486.02; 359/486.03; 359/489.07

(58) Field of Classification Search
CPC ..................................... G02B 5/30; G02B 5/32
USPC ........................... 359/486.01–486.03, 489.07
See application file for complete search history.

(56) References Cited

U.S. PATENT DOCUMENTS

| 6,734,936 B1 * | 5/2004 | Schadt et al. ................. 349/117 |
| 2006/0250694 A1 * | 11/2006 | Williams et al. .............. 359/489 |
| 2007/0019179 A1 * | 1/2007 | Fiolka et al. .................... 355/71 |

FOREIGN PATENT DOCUMENTS

| EP | 0419257 A2 | 3/1991 |
| WO | 2008/071822 A1 | 6/2008 |

OTHER PUBLICATIONS

International Search Report dated Nov. 18, 2011 for PCT/FR2011/051716 filed Jul. 18, 2011.
Written Opinion dated Nov. 29, 2011 for PCT/FR2011/051716 filed Jul. 18, 2011.

(Continued)

*Primary Examiner* — Frank Font
(74) *Attorney, Agent, or Firm* — Brooks Kushman P.C.

(57) ABSTRACT

A bidirectional Cartesian-cylindrical converter system and method for converting the spatial distribution of polarization states include a radial polarization converter capable of receiving a linearly polarized, spatially uniform, polarization distribution beam in order to convert it into a beam having a radial or azimuthal distribution of polarization states about an axis of symmetry. An optical device compensates for the phase shift induced by the radial polarization converter and is capable of introducing a spatially uniform phase shift to compensate for the phase shift introduced by the radial polarization converter.

10 Claims, 5 Drawing Sheets

(56) References Cited

OTHER PUBLICATIONS

Aharon, Ofir, Liquid crystal tunable filters and polarization controllers for biomedical optical imaging, SPIE vol. 7050 70500P-1, SPIE Digital Library, Published Aug. 28, 2008.

Stalder, M., Linearly polarized light with axial symmetry generated by liquid-crystal polarization converters, XP 000639753, vol. 21, No. 23, Jul. 15, 1996, Optical Society of America.

Yoshiki, K., SHG microscopy excited by polarization controlled beam for three-dimensional molecular orientation measurement, SPIE vol. 6290, 62900F, SPIE Digital Library, Published Sep. 9, 2006.

Yamaguchi, Rumiko, Liquid crystal polarizers with axially symmetrical properties, Japanese Journal of Applied Physics, vol. 28, No. 9, Sep. 1989, pp. 1730-1731, Tokyo, Japan.

\* cited by examiner

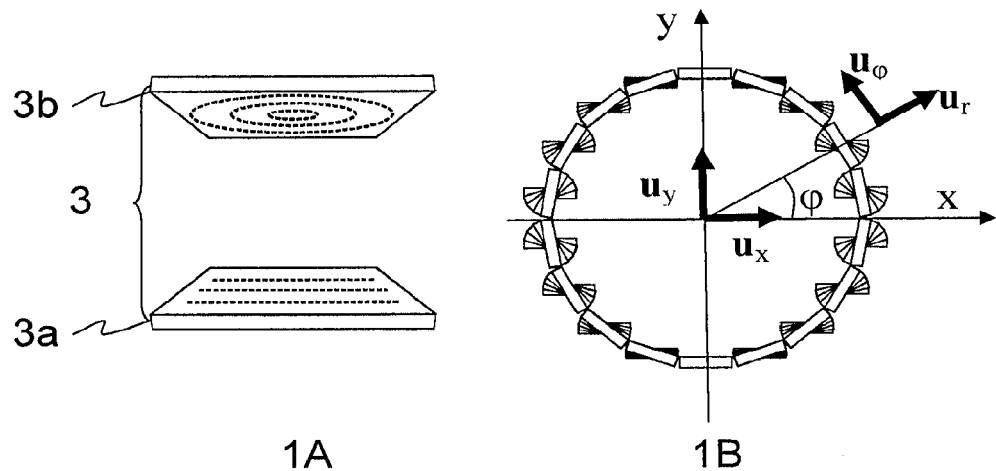
Figure 1 *(PRIOR ART)*
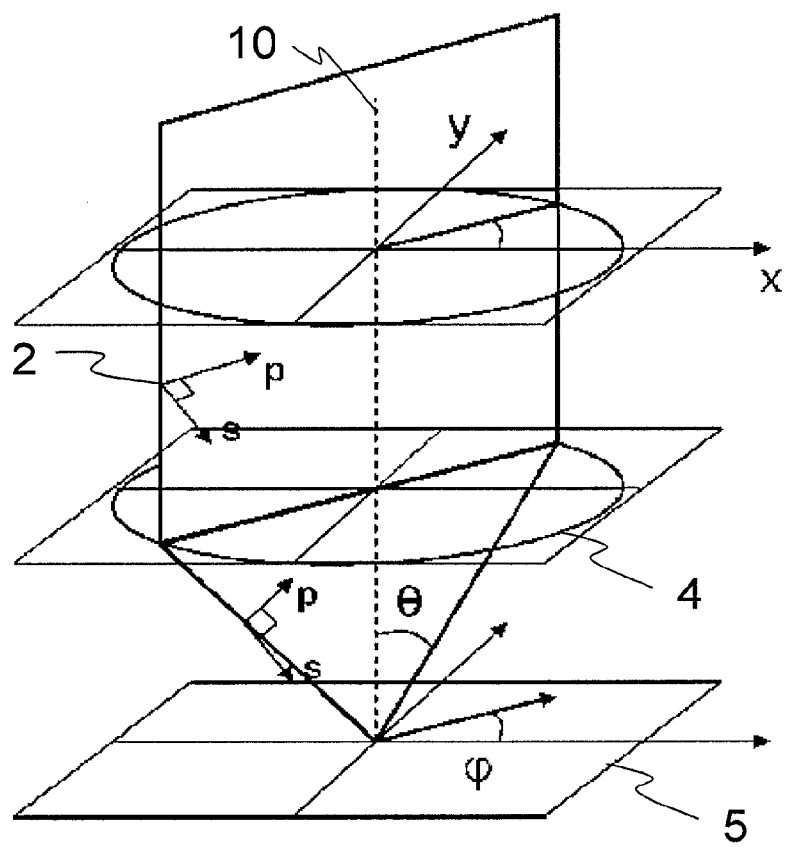
Figure 2 *(PRIOR ART)*

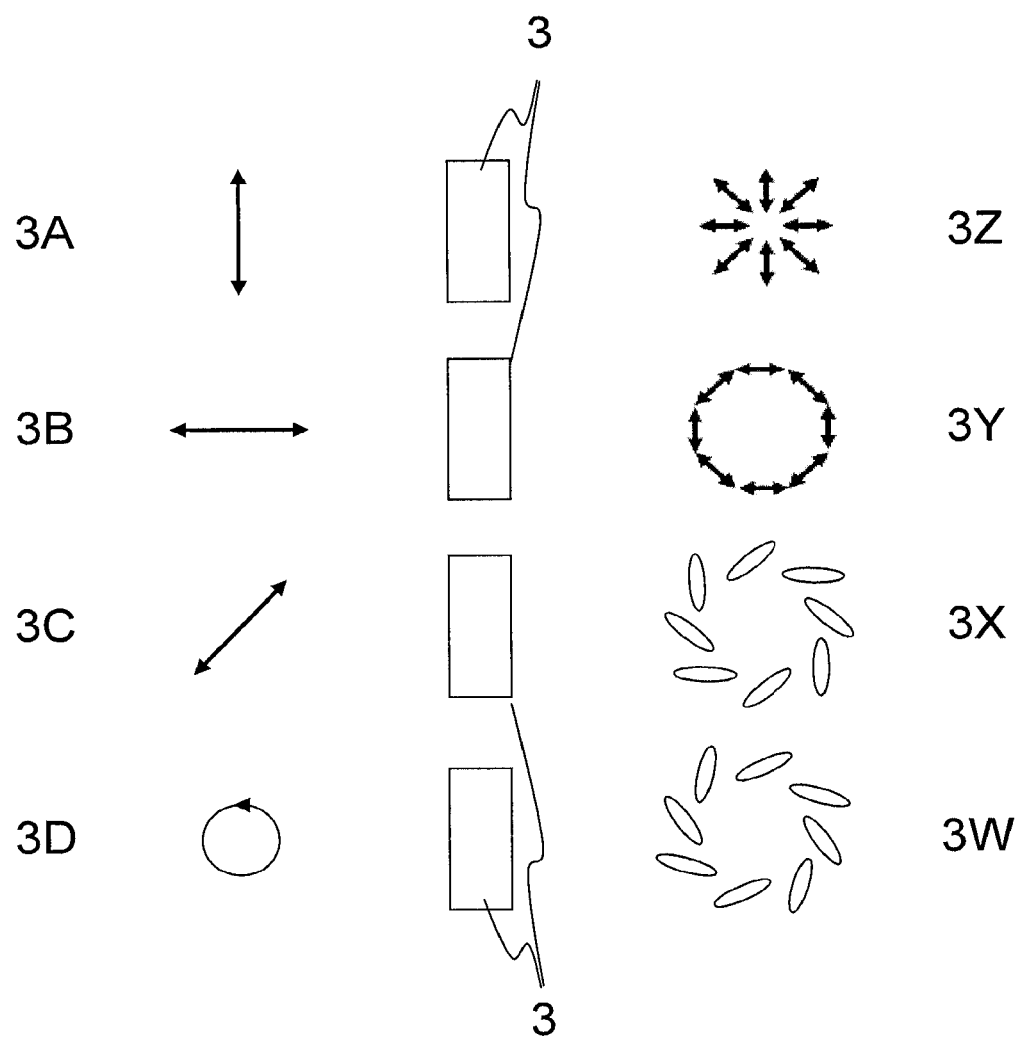
Figure 3 *(PRIOR ART)*

POLARIZATION CONVERTER OF BIDIRECTIONAL CYLINDRICAL SYMMETRY AND CARTESIAN-CYLINDRICAL POLARIZATION CONVERSION METHOD

CROSS-REFERENCE TO RELATED APPLICATION

This application is the U.S. national phase of PCT Appln. No. PCT/FR2011/051716 filed on Jul. 18, 2011, which claims priority to French Patent Application No. 1055839 filed on Jul. 19, 2010, the disclosures of which are incorporated in their entirety by reference herein.

The present invention relates to an optical polarization converter system. More precisely, the invention relates to a bidirectional optical system for converting, in a first sense of propagation, a beam of spatially uniform polarization into a beam having a polarization state distribution of cylindrical symmetry about an optical axis, said optical system being capable of converting, in a reverse sense of propagation, a beam having a polarization state distribution of generalized cylindrical symmetry about an optical axis into a spatially uniform polarization beam. The cartesian-cylindrical polarization converter of the invention is preferably achromatic.

A great number of optical metrology devices, such as polarimeters, ellipsometers, etc., use the specific properties of polarized light in the light-matter interaction. Scientific instrumentation uses in particular the polarized light emitted by laser sources, the more often linearly polarized. Techniques of imagery also use the properties of polarized light to improve the contrast of the images. Therefore, a phase contrast or interferential contrast microscope incorporates a birefringent element to split a light beam into two beams having polarization states that are respectively perpendicular to each other and to recombine them so as to subtract the contribution of the background and to improve the contrast of the image.

The more often, a light beam of spatially homogeneous polarization is used, this polarized beam being generated directly by a source (for example, a laser) or by the combination of a non-polarized source with one or several optical components (polarizer, retardation plate, polarization rotator . . . ). The polarization state for a beam having a spatially homogeneous polarization state distribution can then be described by its coordinates in a vector basis defining the two perpendicular axes of a cartesian system (x, y) in a wave plane perpendicular to the optical axis of the beam (cf. FIG. 1B).

However, in more and more applications, it is desired to use a spatially heterogeneous polarized light. In this case, the polarization of the beam is a non-homogeneous polarization state distribution, the more often with a rotational symmetry (radial or azimuthal polarization, for example) for which a polar coordinates basis $(r, \phi)$ is more adapted (FIG. 1B). Indeed, it has been demonstrated that the focusing of a radial polarization beam allows reaching a beam size lower than the limit diameter of focusing of a non-polarized beam, which constitutes a major advance in micro-lithography, for example.

The interest about the beams having a radial or azimuthal polarization state distribution comes with a demand about components making it possible to convert a homogeneous polarization state distribution into a heterogeneous polarization state distribution.

Various components have been developed to convert a beam of spatially uniform linear polarization into a beam having either a radial or an azimuthal polarization distribution. The components available are based on various technologies:

A first category comprises components formed of an assembly of sectors of retardation plates whose axes are angularly distributed so as to locally modify the polarization of the incident beam. For example, the patent US2007/0115551 describes a component comprising eight distinct angular sectors. However, this type of components does not make it possible to obtain a continuous spatial polarization state distribution.

A second category includes optical components based on combinations of diffraction grating patterns, such as those described in the patent U.S. Pat. No. 7,570,427 B1 or in the publication of M. Lerman and U. Levy, "Generation of a radially polarized light beam using space-variant subwavelength gratings at 1064 nm", Optics Letters 33, n° 23, pp. 2783-2784, 2008.

Finally, there exist components based on liquid crystals. The publication of M. Stalder and M. Schadt (Linearly polarized light with axial symmetry generated by liquid-crystal polarization converters, Optics Letters Vol. 21, n° 23, pp. 1948-1950, 1996) describes a radial and azimuthal polarization converter based on a liquid crystal cell, which makes it possible to transform a linearly polarized and spatially uniform light beam into a light beam of either radial or azimuthal polarization, according to whether the orientation of the incident linear polarization is parallel or perpendicular to an axis of alignment of the liquid crystal cell. The publication of S-W Ko., C. Ting, A. Fuh and T. Lin, "Polarization converters based on axially symmetric twisted nematic liquid crystal", Optics express, 18, p 3601, 2010, describes a component having the same properties.

The publication of Stalder and Schadt describes in particular a liquid crystal cell comprising two main layers of liquid crystals arranged as follows: a first layer whose orientation is such that its liquid crystals are aligned parallel to each other and a second layer whose liquid crystals are deposited in concentric circles (cf. FIG. 1A). The intermediate liquid crystals located between these end layers pivot gradually between these two final states (cf. FIG. 1B). In the publication of Ko et al., the second layer of liquid crystals is oriented radially.

The liquid crystal components offer the advantage that they can rather easily be made in various configurations. Generally, the optical liquid crystal components are made by "rubbing" and photo-alignment techniques.

However, it is important to note herein that the various existing polarization converters perform the polarization conversion for particular conditions where the incident beam is linearly polarized and aligned either parallel or perpendicular to an eigen axis of the converter. A linear polarization state parallel to either one of the two eigen axes of the converter actually gives, after conversion into the polar basis, either a radial or an azimuthal polarization distribution.

The use of beams having a spatially heterogeneous polarization state distribution, and in particular spatially distributed according to a cylindrical symmetry, is especially interesting when a polarized beam is coupled to an optical system whose optical properties are rotationally symmetric (optical lenses, microscope objectives, or optical fiber, for example). Indeed, in the case where a planar-wave beam of homogeneous (for example, linear) polarized light illuminates an ideal lens 4 according to its optical axis 10, the image point that is formed in the image focal plane can be described, in geometrical optics, by a set of rays with an angle of incidence $\theta$ and a plane of incidence of azimuth $\phi$ (cf. FIG. 2). However, because of the rotational symmetry of the lens 4 about the optical axis 10, the polarization state distribution of the beam is modified both by the passing through the lens 4 and by the reflection on the sample 5, so that the polarization state of the incident and reflected beam becomes dependent on the plane of incidence from the moment when the lens 4 is passed through. On the contrary, the beam having either a radial or an azimuthal polarization distribution, centered on the axis 10 of a focus lens 4, has not its polarization vector distribution disturbed by the coupling to the focus lens 4. In cylindrical geometry, each azimuthal plane is identical during the passing through the lens. After the passing through the lens 4, the polarization state distribution remains either a radial or an azimuthal polarization distribution, respectively. The either radial or azimuthal polarization state distribution has thus the advantage not to be affected by the focus lens 4.

However, the polarization converter systems presented hereinabove make it possible to obtain only certain spatial polarization distributions and operate in only particular conditions of use: from a uniformly linearly polarized beam, oriented according to an axis of the converter, either a radial or an azimuthal polarization distribution can be obtained.

On the other hand, from a beam having an elliptic polarization state whose spatial distribution is uniform, a radial polarization converter according to the prior art generates generally a beam having a cylindrical symmetry polarization state distribution, but whose polarization state is no longer in the initial elliptic state. Moreover, the cylindrical symmetry polarization state obtained in output also depends a lot on the wavelength. There exists no component that makes it possible to operate, for the whole polarization state basis, a basis change or a bijection from the cartesian coordinates to the polar coordinates, or the reverse.

In the technical field of the non-uniform distribution polarized beams, we talk in particular about polarized beams having a polarization state distribution of the cylindrical symmetry type (Cylindrical Vector Beams or CV Beams). The radial or azimuthal polarization beams are both particular cases of cylindrical symmetry beams, in which the polarization state is linear and the polarization axis is either radially or azimuthally distributed with respect to the optical axis of the beam. There exist other beams having a polarization state distribution of cylindrical symmetry. Firstly, linear polarization beams exist, whose polarization axis has a constant angle with respect to the local radial axis. Such beams are obtained for example by a linear combination, without phase shift, between two components p and s. Cylindrical symmetry elliptic polarization beams also exist, the polarization distribution comprising polarization states of spatially uniform ellipticity and whose ellipse axis is inclined by a constant angle with respect to the local radial angle.

A generalized cylindrical symmetry polarized beam is a beam having a cylindrical symmetry polarization state distribution that is neither limited to a radial polarization nor to an azimuthal polarization.

No polarization converter exists, which is capable of generating a distribution of some polarization states or other with a generalized cylindrical symmetry (CV beam) from a beam having a uniform polarization state distribution. Conversely, no polarization converter exists, which is capable of receiving a beam of generalized cylindrical symmetry polarization and of converting it into a beam of spatially uniform polarization.

The present invention aims to remedy these drawbacks and relates more particularly to a bidirectional, cartesian-cylindrical spatial polarization state distribution converter capable of converting, in a first sense of propagation, a beam having a uniform spatial polarization state distribution into a beam having a generalized cylindrical symmetry spatial polarization state distribution, and said cartesian-cylindrical converter being capable of converting, in a second sense of propagation, a beam having a generalized cylindrical symmetry spatial polarization state distribution into a beam having a uniform spatial polarization state distribution.

According to the invention, the cartesian-cylindrical converter comprises:
  a radial and azimuthal polarization converter having an axis of symmetry, said radial and azimuthal polarization converter being capable of receiving a linearly polarized beam of spatially uniform polarization distribution to convert it into a beam having a radial or azimuthal symmetry polarization distribution, and
  optical means for compensating for the retardance induced by said radial and azimuthal polarization converter, said optical compensation means being capable of introducing a spatially uniform phase shift of amplitude equal to $-\chi$ so as to compensate for the amplitude of the phase shift $\chi$ introduced by said radial and azimuthal polarization converter.

According to a preferred embodiment of the invention:
  the radial and azimuthal polarization converter comprises a first cartesian symmetry face and a second cylindrical symmetry face, and said optical compensation means having eigen axes of polarization are arranged on the side of the cartesian face of the radial and azimuthal polarization converter, the eigen axes of the optical compensation means being aligned with respect to the eigen axes of said cartesian face;
  the radial and azimuthal polarization converter comprises a liquid crystal converter having a first face with a rectilinear alignment of liquid crystals and a second face with an alignment of liquid crystals in concentric circles;
  the optical compensation means comprise a birefringent plate with two eigen axes, said birefringent plate being capable of introducing a retardance between linear polarizations oriented according to its eigen axes, said birefringent plate being arranged on the side of the first cartesian face of said radial and azimuthal converter.

According to various aspects of embodiments of the invention:
  the birefringent plate has a thickness capable of compensating for the retardance of the radial and azimuthal polarization converter over a wavelength range, so as to make the cartesian-cylindrical polarization converter achromatic over said wavelength range,
  the optical compensation means comprise a liquid crystal cell.

The present invention also relates to an optical system comprising a cartesian-cylindrical polarization converter according to an embodiment of the invention and further comprising, according to various aspects of the invention:
  at least one polarization beam splitting filter;
  at least one optical lens centered on the axis of symmetry of the radial polarization converter, the lens being arranged on the side of the cylindrical face of the radial converter.

The present invention also relates to a cartesian-cylindrical polarization state converter microscope objective comprising a cartesian-cylindrical polarization converter according to one of the preceding embodiments and a mechanical fitting adapted to be fixed on a microscope.

Finally, the present invention also relates to a method of cartesian-cylindrical polarization conversion using a radial and azimuthal polarization converter and optical means for compensating for the retardance between the radial and azimuthal polarizations induced by said radial and azimuthal polarization converter, said optical compensation means being capable of introducing a spatially uniform phase shift of amplitude equal to $-\chi$ so as to compensate for the amplitude of the phase shift χ introduced by said radial and azimuthal polarization converter, to convert, in a first sense of propagation, a beam having a uniform spatial polarization state distribution into a beam having a generalized cylindrical symmetry spatial distribution of the same polarization state and/or to convert, in a second sense of propagation, a beam having a generalized cylindrical symmetry spatial polarization state distribution into a beam having uniform spatial distribution with the same polarization state.

The invention will find a particularly advantageous application in the fields of spatially-resolved ellipsometry, microellipsometry, ellipsometric contrast microscopy, field contrast microscopy, or polarized light microscopy.

The present invention also relates to the characteristics that will be revealed by the following description and that will be considered either alone or in any technically possible combination thereof.

This description is given by way of non-limitative example and will allow a better understanding of how the invention can be implemented, with reference to the appended drawings, in which:

FIG. 1A schematically shows an exploded view of a radial and azimuthal converter according to the prior art and FIG. 1B shows the expression of a polarization state basis in a cartesian and cylindrical system;

FIG. 2 shows a scheme of principle of the propagation of a polarized beam after double-passing through an objective and reflection on a sample;

FIG. 3 schematically shows the effect of a radial and azimuthal polarization converter on various polarization states;

FIG. 4 schematically shows the effect of a polarization converter according to the invention on various polarization states;

FIG. 5 schematically shows a perspective view of an optical polarization converter system according to an embodiment of the invention;

FIG. 6 schematically shows a sectional view of a microscope objective integrating a polarization converter system according to an embodiment of the invention;

Figure 4:
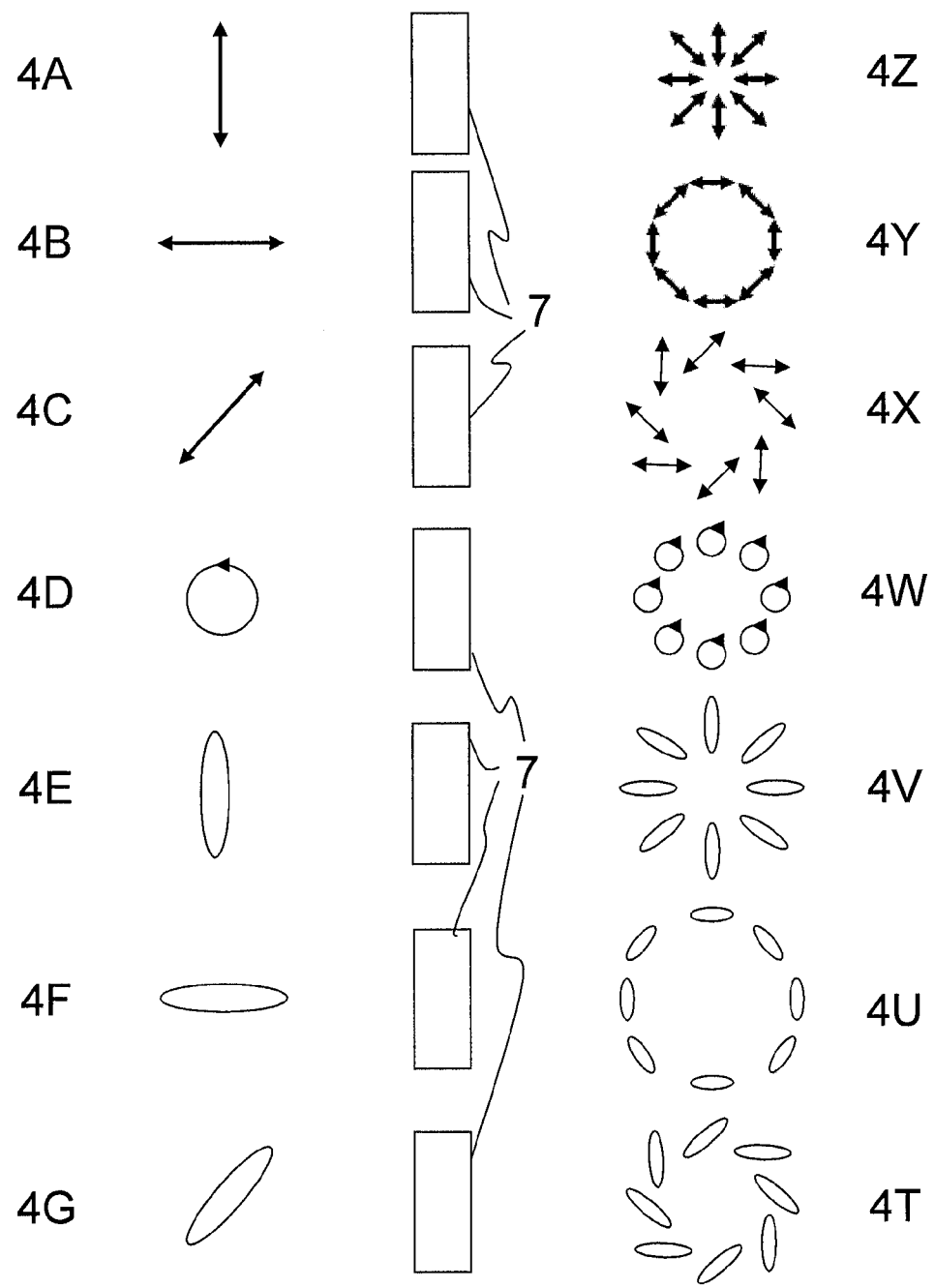

The operation of a radial and azimuthal polarization converter will be first analyzed, for example according to the principle described by Stalder and Schadt, and schematically shown in FIG. 1A. Such a radial polarization converter 3 uses a cell with liquid crystal layers having a face 3a where the liquid crystals are aligned according to an axis transverse to the optical axis and a face 3b where the liquid crystals are aligned according to concentric circles of center O centered on the optical axis. However, a liquid crystal cell of a radial converter 3 produces birefringence by introducing an optical path difference between the two polarizations aligned according to the eigen axes of the converter (ordinary axis of index $n_o$ and extraordinary axis of index $n_e$). The value of this optical path difference, also called retardance, is the product of the difference $\Delta n = n_e - n_o$, by the thickness d of the passed-through liquid crystal layers. This optical path difference introduces a phase shift χ between the two polarizations aligned according to the eigen axes of the converter, which depends on the wavelength λ. The phase shift χ is given by the conventional formula:

$$\chi = \frac{2 \cdot \pi \cdot d \cdot \Delta n}{\lambda} \quad (\mathrm{I})$$

FIG. 1B shows the expression of a polarization state basis in a cartesian and cylindrical system. It shows a representation, in this system, of the orientation of the crystals between the two end layers according to their distribution. The effect of the passing through the radial polarization converter 3 may be expressed in the form of a Jones transfer matrix through a component such as described in the publication of Stalder and Schadt. By expressing the initial polarization state and the final polarization state in the basis (x, y), this Jones matrix is written as:

$$J_{x,y} = \begin{bmatrix} 1 & 0 \\ 0 & e^{j\chi} \end{bmatrix} \begin{bmatrix} \cos\varphi & 0 \\ 0 & \sin\varphi \end{bmatrix}$$

By expressing the initial polarization state in the basis (x, y) and the final polarization state in the cylindrical basis, this Jones matrix is written as:

$$J_{x,y \rightarrow \rho,\varphi} = \begin{bmatrix} 1 & 0 \\ 0 & e^{j\chi} \end{bmatrix}$$

Thus, a phase shift χ appears, which is due to the passing through the component.

FIG. 3 schematically shows the effect of a radial and azimuthal polarization converter on various polarization states in the sense of propagation from the "cartesian" face 3a toward the "cylindrical" face 3b.

FIG. 3A shows the effect of passing through the radial converter for an incident beam linearly polarized and aligned parallel to the eigen axis of the input face 3a, the incident beam having a uniform spatial polarization state distribution (graphically represented on the left of the converter by a vertical arrow). At the output of the radial converter 3, on the "cylindrical" face side, a beam is obtained, FIG. 3Z, which is linearly polarized and whose spatial polarization state distribution is radial (graphically represented on the right of the converter).

FIG. 3B shows the transformation of an incident beam linearly polarized and aligned perpendicular to the eigen axis of the input face 3a, the incident beam having a uniform spatial polarization state distribution (graphically represented on the left of the converter by a horizontal arrow). At the output of the radial converter 3, on the "cylindrical" face side, a beam is obtained, FIG. 3Y, which is linearly polarized and whose spatial polarization state distribution is azimuthal.

FIG. 3C graphically shows the transformation of an incident beam linearly polarized and inclined with respect to the eigen axis of the input face 3a of the radial converter (i.e. a linear combination of the parallel (FIG. 3A) and perpendicular (FIG. 3B) polarizations). At the output of the radial converter 3, on the "cylindrical" face side, a beam is obtained, FIG. 3X, which is not linearly but elliptically polarized (due to the phase shift induced by the radial converter 3). The distribution of the beam of FIG. 3C at the output of the radial converter has a rotational symmetry. It is therefore a polarized beam with a cylindrical rotational symmetry (CV Beam).

FIG. 3D graphically shows the transformation of a circularly polarized incident beam. At the output of the radial converter 3, on the "cylindrical" face side, a beam is obtained, FIG. 3W, which is not circularly but elliptically polarized, due to the phase shift induced by the radial converter 3.

A first observation within the invention is that a radial and azimuthal converter keeps the polarization state for only a linear polarization state that is either parallel or perpendicular to the eigen axis of the radial converter 3.

The invention proposes an optical system making it possible to completely operate the switch from a polarization state in a cartesian system to the same state of polarization in a polar coordinate system, whatever the polarization state of the incident beam.

According to a first embodiment, the optical polarization converter system 7 of the invention comprises a radial polarization converter 3 coupled to compensation means that introduce a phase shift $\chi'$ substantially opposed to the phase shift $\chi$ introduced by said radial polarization converter 3, i.e. $\chi+\chi'\approx 0$.

By expressing the initial polarization state and the final polarization state in the basis (x, y), the Jones matrix of the converter according to the invention is written as:

$$J_{x,y} = \begin{bmatrix} 1 & 0 \\ 0 & e^{j(\chi+\chi')} \end{bmatrix} \begin{bmatrix} \cos\varphi & 0 \\ 0 & \sin\varphi \end{bmatrix} \approx \begin{bmatrix} \cos\varphi & 0 \\ 0 & \sin\varphi \end{bmatrix}$$

By expressing the initial polarization state in the basis (x, y) and the final polarization state in the cylindrical basis, this Jones matrix is written as:

$$J_{x,y\to\rho,\varphi} = \begin{bmatrix} 1 & 0 \\ 0 & e^{j(\chi+\chi')} \end{bmatrix} \approx \begin{bmatrix} 1 & 0 \\ 0 & 1 \end{bmatrix}$$

Figure 5:
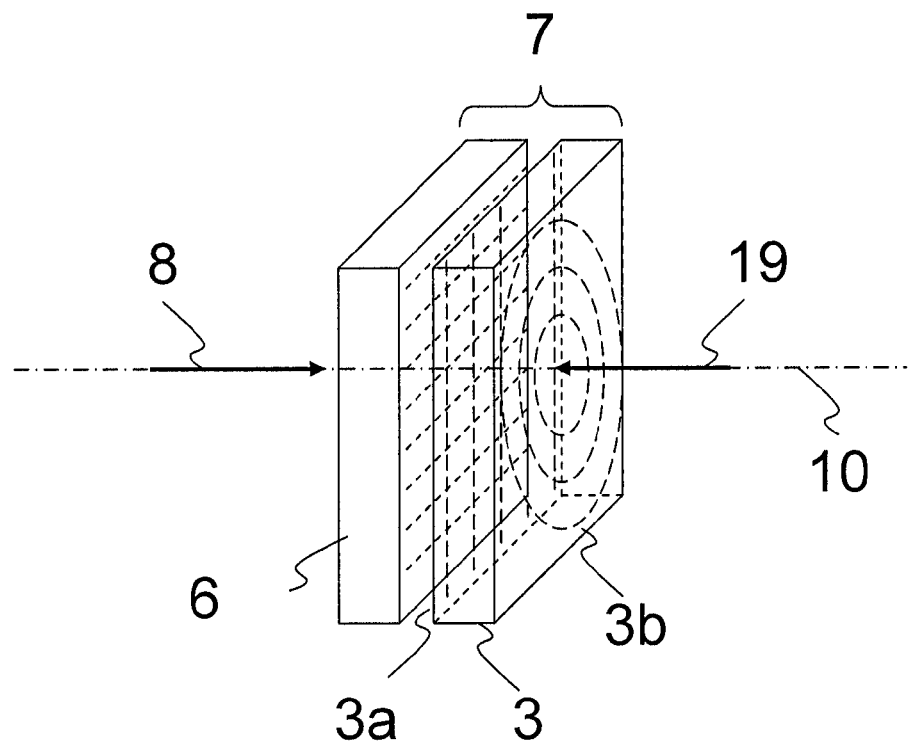

FIG. 5 shows a polarization converter system according to the preferred embodiment of the invention. The polarization converter system 7 comprises means for compensating for the phase shift and a radial polarization converter 3 centered on the optical axis 10. The phase-shift compensation means comprise a retardation plate 6 placed in front of the radial polarization converter 3 on the side of the uniform polarization beam 8 and of the "cartesian" face 3a of the radial and azimuthal converter 3. The retardation plate 6 may be a fixed retardation plate, or a so-called multi-order plate, whose retardance $\Delta n \cdot d$ is suitably calculated by choosing the material and the thickness necessary for the polarization conversion, or it may be consisted of a layer of liquid crystals identical to those of the radial polarization converter 3, the liquid crystal of the retardation plate being arranged between two faces oriented linearly. The orientation of the liquid crystal layer of the retardation plate 6 is then chosen as being perpendicular to that of the face 3a of the radial converter 3 for which the liquid crystals are parallel to each other (cf. FIG. 5). This way, the extraordinary and ordinary eigen axes of a liquid crystal cell are permuted in the following one.

A known radial and azimuthal liquid-crystal converter may be provided with a retardation plate that covers half of this converter. This compensation plate has a generally adjustable retardance, so that its value can be fixed to $\lambda/2$, where $\lambda$ is the working wavelength chosen by the user. Such a retardation plate has for function to change the sense of the polarization state, without changing its direction. Indeed, it is observed that the radial or azimuthal polarization state radiation produced at the output has a phase state that is constant over each half of the component, but that differs by an angle m between each of these halves. Such "semi-cylindrical symmetry" phase distribution may be harmful in certain applications. To obtain a cylindrical symmetry phase distribution, it is known to add a compensation retardation plate, having a retardance of $\lambda/2$. Such a compensation plate (called a $\lambda/2$ plate) has by no means for effect to compensate for the retardance introduced by the radial converter between the various components of the polarization that pass through it in a same point. Let's underline, on the one hand, that the retardation plate intervening in the intervention covers the whole surface of the radial and azimuthal converter, and not half of it; and on the other hand, it has, in the example mentioned, a retardance far higher than $\lambda/2$ (and even higher than $5\lambda/2$).

On the contrary, according to the invention, the retardation introduced by the plate 6 is chosen so as to introduce an optical path difference between its slow axis and its fast axis, identical to the retardance $\Delta n \cdot d$ added by the radial and azimuthal converter. Moreover, the orientation of the plate 6 is chosen so that its slow axis coincides with the fast axis of the radial and azimuthal converter, so that the optical path differences between the polarization compensate for each other for a ray that passes through the retardation plate 6 and the radial and azimuthal converter 3. This way, the passing through the retardation plate 6 introduces a phase shift that compensates for that which is introduced by the radial polarization converter, for each of the wavelengths.

FIG. 4 schematically shows the effect of a polarization converter according to the invention on various polarization states in the sense of propagation from a cartesian system toward a cylindrical system.

FIG. 4A shows the effect of passing through the converter 7 of the invention for an incident beam linearly polarized and aligned parallel to an eigen axis of the input cartesian face of the converter 7, the incident beam having a uniform spatial polarization state distribution (graphically represented on the left of the converter by a vertical arrow). At the output of the converter 7, on the cylindrical system side, a beam is obtained, FIG. 4Z, which is linearly polarized and whose spatial polarization state distribution is radial (graphically represented on the right of the converter).

FIG. 4B shows the transformation of an incident beam linearly polarized and aligned perpendicular to an eigen axis of the input cartesian face of the converter 7, the incident beam having a uniform spatial polarization state distribution (graphically represented on the left of the converter by a horizontal arrow). At the output of the converter 7, on the cylindrical system side, a beam is obtained, FIG. 4Y, which is linearly polarized and whose spatial polarization state distribution is azimuthal.

FIG. 4C graphically shows the transformation of an incident beam linearly polarized and inclined by 45 degrees with respect to an eigen axis of the input cartesian face of the converter 7 (i.e. a linear combination of the parallel (FIG. 4A) and perpendicular (FIG. 4B) polarizations). At the output of the converter 3, on the "cylindrical" system side, a beam is obtained, FIG. 4X, with a linear polarization state, the polarization state distribution being a linear polarization inclined by 45 degrees with respect to the local radial axis. The spatial polarization state distribution of the beam of FIG. 4C, at the output of the converter 7, has a rotational symmetry. It is actually a polarized beam with a cylindrical rotational symmetry (CV Beam).

FIG. 4D graphically shows the transformation of a circularly polarized incident beam (i.e. a linear combination with a phase shift between a parallel linear polarization state and a perpendicular linear polarization state). At the output of the converter 7, on the cylindrical system side, a beam is obtained, FIG. 4W, which is circularly polarized and which has a rotational symmetry. It is therefore actually a polarized beam with a cylindrical rotational symmetry (CV Beam).

FIG. 4E graphically shows the transformation of an incident beam having an elliptic polarization state whose major axis of the ellipse is aligned according to an eigen axis of the input cartesian face of the converter 7. At the output of the converter 7, on the cylindrical system side, an elliptically polarized beam is obtained, FIG. 4V. The spatial distribution of this polarization state is such that the major axis of the ellipse is locally aligned according to a radial direction. As the passing through the converter 7 does not induce a phase shift, the elliptic polarization state is not modified, only the spatial distribution, i.e. the orientation of the ellipse, is modified. A beam is again obtained, FIG. 4V, which has a polarization state distribution of cylindrical symmetry about the optical axis (CV Beam).

FIG. 4F graphically shows the transformation of an incident beam having an elliptic polarization state whose major axis of the ellipse is transverse to an eigen axis of the input cartesian face of the converter 7. At the output of the converter 7, on the cylindrical system side, an elliptically polarized beam is obtained, FIG. 4U. The spatial distribution of this polarization state is such that the major axis of the ellipse is locally aligned according to an azimuthal direction. As the passing through the converter 7 does not induce a phase shift, the elliptic polarization state is not modified, only the spatial distribution, i.e. the orientation of the ellipse, is modified. A beam is obtained, FIG. 4U, which has also a polarization state distribution of cylindrical symmetry about the optical axis (CV Beam).

Finally, FIG. 4G graphically shows the transformation of an incident beam having an elliptic polarization state whose major axis of the ellipse is inclined by 45 degrees with respect to an eigen axis of the input cartesian face of the converter 7. At the output of the converter 7, on the cylindrical system side, an elliptically polarized beam is obtained, FIG. 4T. The spatial distribution of this polarization state is such that the major axis of the ellipse is locally inclined by 45 degrees with respect to the radial direction. As the passing through the converter 7 does not induce a phase shift, the elliptic polarization state is not modified, only the spatial distribution, i.e. the orientation of the ellipse, is modified. A beam is obtained, FIG. 4T, which has also a polarization state distribution of cylindrical symmetry about the optical axis (CV Beam).

It is thus observed that a converter according to the invention keeps the polarization state of the beam for a linear, a circular or an elliptic polarization state and whatever its inclination with respect to an eigen axis of the cartesian face of the converter 7. It is also observed that the converter system of the invention makes it possible to generate a beam with a cylindrical symmetry spatial polarization state distribution, whatever the polarization state of the incident beam.

More generally, the polarization converter makes it possible to switch from a beam having some uniform polarization state or other to a beam with a polarization state distribution of cylindrical symmetry about the optical axis 10.

Advantageously, the retardation plate 6 is consisted of a layer of liquid crystals oriented parallel to each other but perpendicular to the first layer of the radial polarization converter, the retardation plate being arranged on the side of the cartesian face of the radial and azimuthal converter, which makes it possible to obtain a perfectly achromatic correction of the phase shift.

FIG. 5 shows the bidirectional operation of the cartesian-cylindrical converter. In a first sense of propagation, a beam 8 having a spatially uniform polarization state distribution is directed on the retardation plate 6, then on the cartesian face 3a of the radial converter 3. The beam 8, after having passed through the radial polarization converter 3, goes out in the form of a beam having a polarization state of cylindrical symmetry about the optical axis 10. In the reverse sense of propagation, a beam 9 having a polarization state distribution of cylindrical symmetry about the optical axis 10 is directed on the rotational symmetry face 3b of the radial converter 3. The beam 9, after having passed through the radial polarization converter 3, and through the retardation plate 6, goes out in the form of a beam having a spatially uniform polarization state, because the retardation plate 6 compensates exactly for the phase shift introduced by the radial converter 3.

By reciprocity, the polarization converter 7 of the invention makes it possible to transform a beam having a polarization state distribution of cylindrical symmetry about an optical axis 10 (or generalized CV beam) into a beam having a uniform polarization state distribution. Moreover, the polarization state of a beam is kept during the passing through the polarization converter 7, only its spatial distribution being modified.

The polarization converter system of the invention is thus a bijective converter of spatial polarization state distribution. In one sense of propagation, the converter 7 makes it possible to switch from a polarization state having a uniform spatial distribution to a cylindrical symmetry spatial distribution of the same polarization state. In the reverse sense of propagation, the converter 7 makes it possible to switch from a beam having a polarization state whose spatial distribution is of cylindrical symmetry to a beam having a spatially uniform distribution of the same polarization state.

The system of the invention thus makes it possible to modify the spatial distribution of polarization states independently of the polarization state of the incident beam.

The system of the invention makes it possible to convert a beam having some polarization state or other and a uniform polarization state distribution into a beam having a cylindrical symmetry distribution of this same polarization state.

The polarization converter system of the invention does not operate only in the sense of propagation for converting a beam having a uniform polarization distribution in cartesian coordinates into a beam having a cylindrical symmetry polarization state distribution.

In the other sense of propagation of the light, the system of the invention offers the advantage that it also makes it possible to convert a beam having a cylindrical symmetry polarization state distribution into a beam having a uniform distribution in a cartesian system of this same polarization state, whatever the polarization state of the incident beam of cylindrical symmetry spatial distribution.

A same converter 7 can thus be used in the two senses of propagation.

The polarization converter system of the invention thus makes it possible to generate beams having a polarization state distribution that is not limited to a radial distribution or an azimuthal distribution of linear polarization states. On the contrary, the system makes it possible to generate any linear combination of polarization states comprising a non-zero radial component and a non-zero azimuthal component. When the retardation between the radial component and the azimuthal component is zero, the resulting polarization state remains a linear polarization state whose spatial distribution may be of cylindrical symmetry, the orientation of the polarization axis being neither radial nor ortho-radial but inclined with respect to the radial direction by a constant angle whatever the local position in the beam. When the retardation between the radial component and the azimuthal component is equal to $\pi/2$, the resulting polarization state is a circular polarization state (whose spatial distribution is both uniform and of cylindrical symmetry). When the retardation between the radial component and the azimuthal component is higher than zero and lower than π/2, the resulting polarization state is an elliptic polarization state, whose spatial distribution is of cylindrical symmetry, the ellipse axis being inclined by a constant angle with respect to the local radial direction, whatever the local position in the beam.

The capacity of the system of the invention to operate in the two senses of propagation, for some polarization states or other, allows very interesting applications.

For example, in an application of reflection (or transmission) microscopy, the return trip makes it possible to do the reverse change from polar coordinates toward the cartesian coordinates. Therefore, in such application, the double-passing through the system makes it possible to compensate, both on the going and the return trip, for the phase shift introduced by the radial converter alone and makes the system achromatic.

The system of the invention thus makes it possible to make an imaging device (microscope, for example) having a well-controlled polarization state, of cylindrical symmetry, through the whole numerical aperture N.A. of an objective, while keeping the lateral resolution of 1.22λ/N.A.

Finally, whatever the polarization state of the light beam that passes through this new component 7, a total conversion or bijection is produced between the cartesian basis of polarization state distribution and the polar basis of polarization state distribution.

The aimed applications preferably use a spatially homogeneous polarized light so as to be able to characterize the conversion.

As described hereinabove, the importance of having, for some applications, beams of spatially heterogeneous and cylindrical symmetry polarized light for use in an optical system whose properties have a rotational symmetry (lenses, microscope objective) has been underlined. It is therefore natural to contemplate a component such as described hereinabove, coupled to such an optical system, with or without field or aperture diaphragms or, more generally, spatial or spectral filters.

Figure 6:
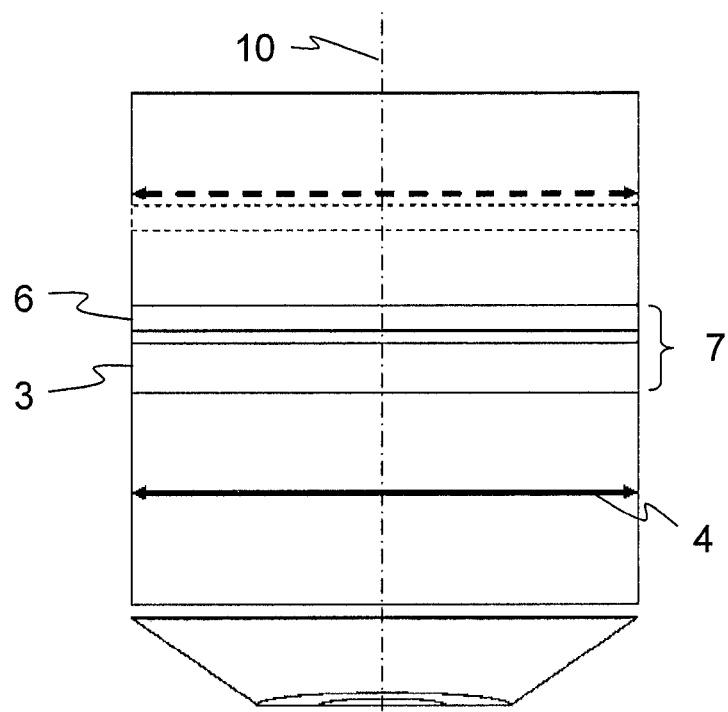

FIG. 6 shows another advantageous embodiment of the invention. More precisely, FIG. 6 shows a microscope objective modified so as to integrate a polarization converter system 7 according to the invention. The objective comprises a lens optical system 4 and a mechanical fitting so that it can be mounted in place of a standard microscope objective.

More generally, a focusing polarization converter system comprises a cartesian-cylindrical polarization converter 7 combined to an optical lens placed in front or behind the polarization converter, the lens being placed on the cylindrical system side of the converter 7. This optical system makes it possible to operate a bijection between a polarization state distribution in the cartesian basis and a polarization state distribution (non-spatially homogeneous in the more general case) in the polar basis.

A detailed example of a cartesian-cylindrical converter according to a particular embodiment will now be described. This example of a particular embodiment is based on the use of a radial and azimuthal polarization converter component 3, provided by the Arcoptix Company, and whose principle is that described in the publication of Stalder and Schadt. It has been shown that the optical path difference between a wave transformed into a radial polarization and a wave transformed into an azimuthal polarization is close to 3285 nm. This optical path difference is uniform over the whole component. A quartz birefringent plate 6 is placed in front of the totality of the radial and azimuthal converter. The thickness D of this quartz plate is chosen so that its retardance is of 3285 nm too.

The difference Δn between the ordinary and the extraordinary indices of the quartz it typically Δn=0.00925, D is chosen so that D·Δn=3285 nm, which gives D=355 nm. This retardation plate is placed on the side of the cartesian face of the radial converter, and oriented so that the slow axis of the retardation plate coincides with the fast axis of the cartesian face of the radial/azimuthal converter. Therefore, the retardances of the two components are compensated for each other.

Figure 7:
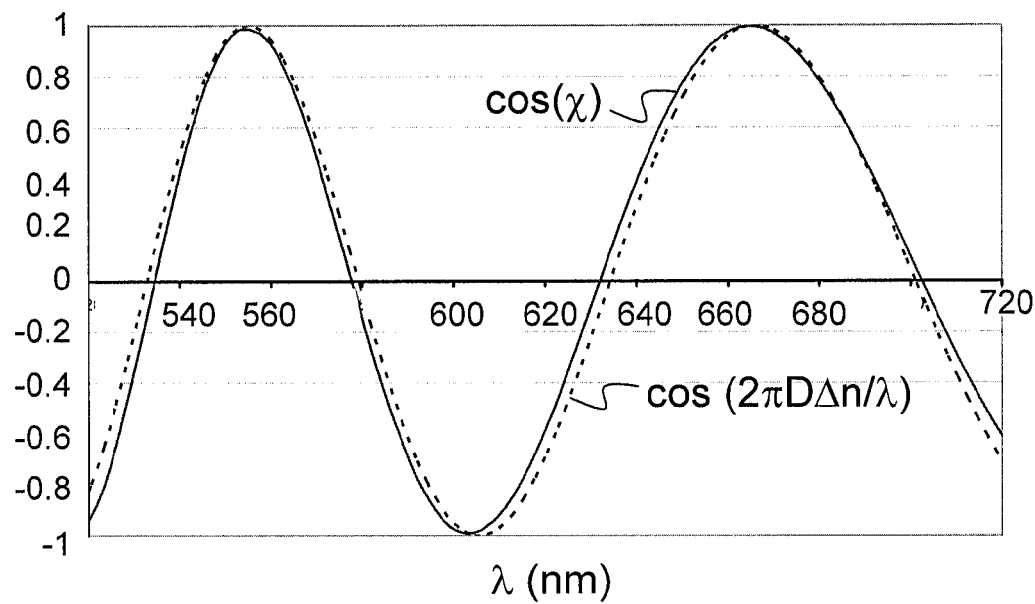
FIG. 7 shows a curve of measurement of the phase shift introduced by a radial and azimuthal converter and a curve of the phase shift of a birefringent compensation plate.

FIG. 7 shows a full-line curve, corresponding to a measurement of the phase shift χ between a wave transformed into a radial polarization and a wave transformed into an azimuthal polarization by the Arcoptix component, as a function of the wavelength λ. The quantity represented is cos χ. The retardance δ is estimated to 3285 nm, by application of the formula:

$$\chi = 2 \cdot \pi \cdot \delta / \pi$$

FIG. 7 also shows a dashed-line curve, corresponding to the curve $\cos(2 \cdot \pi \cdot D \cdot \Delta n / \lambda)$ associated to the phase shift χ' due to the birefringence of a quartz plate 6 of thickness 355 μm, as a function of the wavelength.

Figure 8:
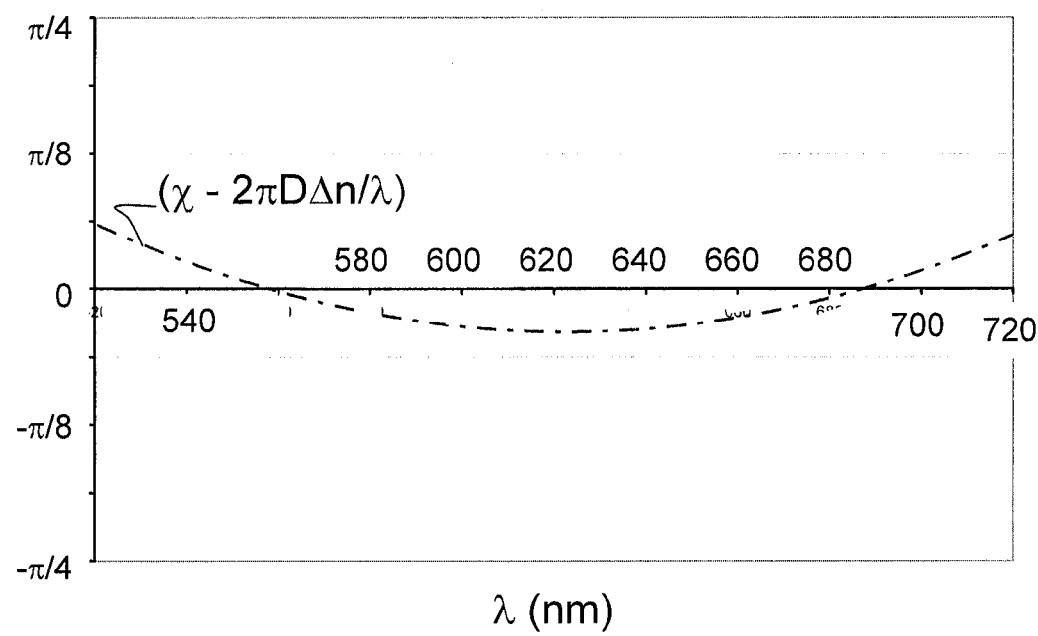
FIG. 8 shows a curve of residual phase shift as a function of the wavelength.

FIG. 8 shows the quantity $\chi - 2 \cdot \pi \cdot D \cdot \Delta n / \lambda$ as a function of the wavelength. This curve is associated with the phase shift between a wave transformed into a radial polarization and a wave transformed into an azimuthal polarization, by the assembling according to the particular embodiment of the invention presented herein. It is observed that this angle expressed in radian remains low over a wide spectrum range, which reveals that the phase shift between a wave transformed into a radial polarization and a wave transformed into an azimuthal polarization is practically zero. From this property, it can then be established that the polarization converter 7 according to this embodiment of the invention makes it possible to modify the spatial distribution of some polarization state or other, to switch from a spatially uniform distribution to a cylindrical symmetry distribution, and the reverse, without modifying the polarization state of the beam.

The contemplated applications relate to optical systems requiring properties having a rotational symmetry, for which the perfect control of the polarization is difficult. The use of the cartesian-cylindrical polarization converter system of the invention coupled to an optical fiber makes it possible to maintain the polarization state at the input of the fiber and avoids the use of a polarization-maintaining optical fiber.

The use of the cartesian-cylindrical polarization converter in microscopy thus makes it possible:

in an interferential contrast microscope, to obtain an improvement of the image contrast;

to make the observations at the Brewster angle more accessible. Indeed, the existing Brewster angle microscopes have physically separated illumination and collection arms. The use of such component would permit a more compact design, a better image (no field-depth problem) and a higher luminosity;

to select a ring or an angle of incidence at the output of the objective, for example.

The cylindrical polarization converter of the invention makes it possible to operate a bijection between a distribution of polarization states expressed in the cartesian basis and a distribution of polarization states with a rotational symmetry, expressed in a polar basis.

More precisely, the polarization converter of the invention makes it possible to modify the spatial distribution of some polarization state or other, to switch from a spatially uniform distribution to a cylindrical symmetry distribution, and the reverse, without modifying the polarization state of the beam. A spatial polarization state distribution converter with polarization state preservation is thus obtained, which operates in a bidirectional way, whatever the polarization state of a beam: linear, circular or elliptic, and whatever the transverse orientation of this polarization state relative to the eigen axes of the converter.

The invention finds application in all the fields where it is desired to use a polarized beam in an optical medium having a cylindrical symmetry. Especially, the invention is aimed at applications of polarized light microscopy, micro-ellipsometry, microscopic resolution ellipsometry, micro-ellipsometry imaging . . . .

The invention also applies to other fields, as for example the optical fibers whose symmetry is also of the cylindrical type, for example to couple a polarized optical beam with a polarization state distribution of generalized cylindrical symmetry to an optical fiber.

The invention claimed is:

1. A bidirectional, cartesian-cylindrical spatial polarization state distribution converter capable of converting, in a first sense of propagation, a beam having a uniform spatial polarization state distribution into a beam having a generalized cylindrical symmetry spatial polarization state distribution, and said cartesian-cylindrical converter being capable of converting, in a second sense of propagation, a beam having a generalized cylindrical symmetry spatial polarization state distribution into a beam having a uniform spatial polarization state distribution, said cartesian-cylindrical converter comprising:
a radial and azimuthal polarization converter having an axis of symmetry, said radial and azimuthal polarization converter being capable of receiving a linearly polarized beam of spatially uniform polarization distribution to convert it into a beam having a radial or azimuthal symmetry polarization distribution, and
an optical compensation device for compensating for the retardance induced by said radial and azimuthal polarization converter, said optical compensation device being capable of introducing a spatially uniform phase shift of amplitude equal to $-\chi$ so as to compensate for the amplitude of the phase shift $\chi$ introduced by said radial and azimuthal polarization converter.

2. The cartesian-cylindrical spatial polarization state distribution converter according to claim 1, wherein the radial and azimuthal polarization converter comprises a first cartesian symmetry face and a second cylindrical symmetry face, and wherein said optical compensation device has eigen axes of polarization arranged on the side of the cartesian face of the radial and azimuthal polarization converter, eigen axes of the optical compensation device being aligned with respect to the eigen axes of said cartesian face.

3. The cartesian-cylindrical polarization converter according to claim 1, wherein the radial and azimuthal polarization converter comprises a liquid crystal converter having a first face with a rectilinear alignment of liquid crystals and a second face with an alignment of liquid crystals in concentric circles.

4. The cartesian-cylindrical polarization converter according to claim 1 wherein the optical compensation device comprises a birefringent plate with two eigen axes, said birefringent plate being capable of introducing a retardance between linear polarizations oriented according to its eigen axes, said birefringent plate being arranged on the side of the first cartesian face of said radial and azimuthal converter.

5. The cartesian-cylindrical polarization converter (7) according to claim 4, characterized in that said birefringent plate has a thickness capable of compensating for the retardance of the radial and azimuthal polarization converter over a wavelength range, so as to make the cartesian-cylindrical polarization converter achromatic over said wavelength range.

6. The cartesian-cylindrical polarization converter according to claim 1 wherein the optical compensation device comprises a liquid crystal cell.

7. The cartesian-cylindrical polarization converter according to claim 1, further comprising at least one polarization beam splitting filter.

8. The cartesian-cylindrical polarization converter according to claim 1, further comprising at least one optical lens centered on the axis of symmetry of the radial polarization converter, the at least one optical lens being arranged on the side of the cylindrical face of the radial and azimuthal polarization converter.

9. The cartesian-cylindrical polarization converter according to claim 1, wherein the cartesian cylindrical polarization state converter is incorporated into a microscope objective, further comprising a mechanical fitting adapted to be fixed on a microscope.

10. A method of cartesian-cylindrical polarization conversion, comprising using a radial and azimuthal polarization converter and an optical device for compensating for the retardance between the radial and azimuthal polarizations induced by said radial and azimuthal polarization converter, said optical compensation device being capable of introducing a spatially uniform phase shift of amplitude equal to $-\chi$ so as to compensate for the amplitude of the phase shift $\chi$ introduced by said radial and azimuthal polarization converter, to convert, in a first sense of propagation, a beam having a uniform spatial polarization state distribution into a beam having a cylindrical symmetry spatial distribution of the same polarization state and/or to convert, in a second sense of propagation, a beam having a generalized cylindrical symmetry spatial polarization state distribution into a beam having a uniform spatial distribution with the same polarization state.

* * * * *